No. 777,606. PATENTED DEC. 13, 1904.
O. B. CREAMER & A. J. Q. KNOWLTON.
TAPER CALIPERS.
APPLICATION FILED AUG. 4, 1904.
NO MODEL.
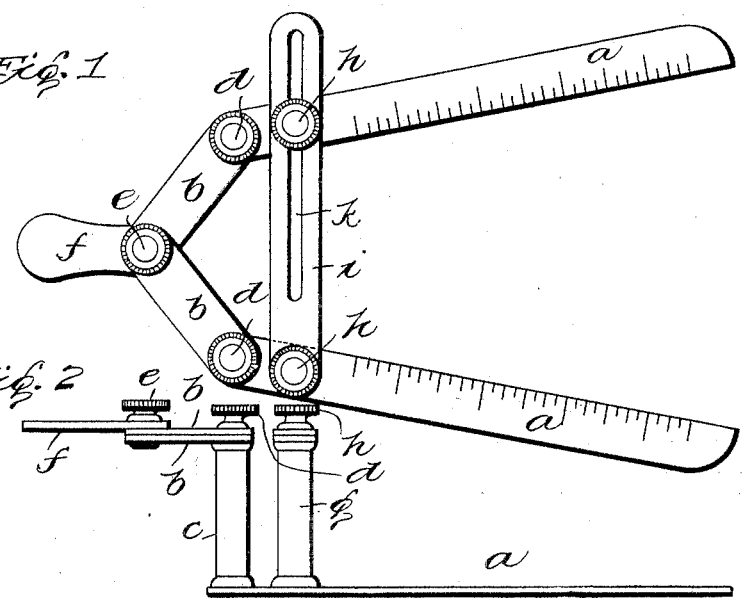
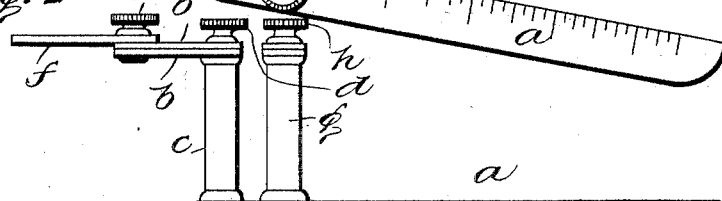
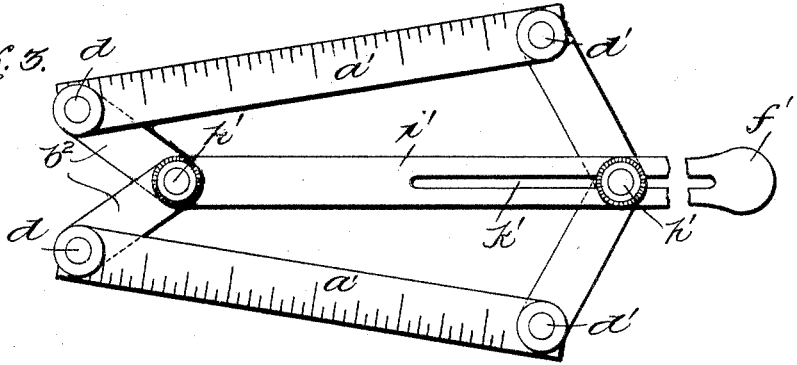
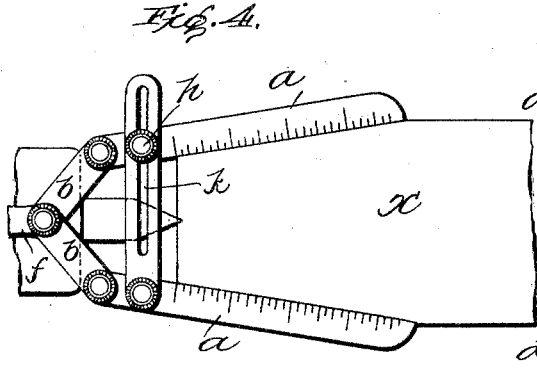
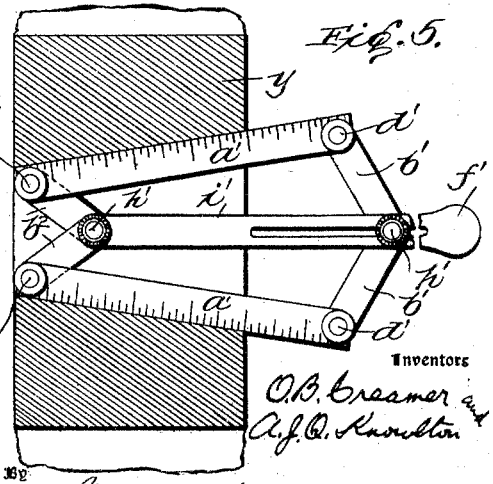

No. 777,606.

Patented December 13, 1904.

UNITED STATES PATENT OFFICE.

OSBORNE B. CREAMER AND ALONZO J. Q. KNOWLTON, OF CAMDEN, MAINE.

TAPER-CALIPERS.

SPECIFICATION forming part of Letters Patent No. 777,606, dated December 13, 1904.

Original application filed March 14, 1904, Serial No. 198,159. Divided and this application filed August 4, 1904. Serial No. 219,488. (No model.)

*To all whom it may concern:*

Be it known that we, OSBORNE B. CREAMER and ALONZO J. Q. KNOWLTON, both of Camden, in the county of Knox and State of Maine, have invented certain new and useful Improvements in Taper-Calipers, of which the following is a specification.

This invention relates to measuring instruments, particularly of that type which is employed for determining the exact taper of an object.

The object of the invention is to provide means for taking taper measurements, the apparatus being constructed so that one of two coacting instruments may be employed for transferring the measurements and taper to the other.

A further object of the invention is to provide calipers of this character which have graduated arms that are supported at two points, so that each arm is braced against swinging when adjusted, the connections employed being links which permit of convenient adjustment.

To these ends the invention consists in the construction and the combination of parts, substantially as hereinafter described and claimed.

Of the accompanying drawings, forming a part of this specification, Figure 1 is a plan view representing the outside calipers. Fig. 2 represents a side elevation of the same. Fig 3 is a plan view showing the inside calipers employed in coöperation with the calipers shown in Figs. 1 and 2. Fig. 4 is a view similar to Fig. 1, on a smaller scale, and showing the device as measuring the tapered ends of a shaft. Fig. 5 is a view similar to Fig. 3, on a smaller scale, and showing the device as applied to calipering the taper hole which has been bored out in an article, such as the hub of a propeller or wheel.

The same reference characters indicate the same parts in all the figures.

Referring first to Figs. 1, 2, and 4, which illustrate the outside calipers, $a$ represents the gage-arms, to the rear ends of which are pivotally connected links $b$, through the medium of stud or sleeve bolts $c$, which are employed for the purpose of offsetting the links $b$ from the plane of the arms $a$. The pivotal connections between the links $b\ b$ and the arms $a\ a$ are provided with lock or set nuts $d$, the said two links $b\ b$ being pivotally connected together and provided with a set or lock nut $e$. Said lock-nut $e$ also secures a suitable handle $f$ to the meeting points of the two links $b\ b$. Secured to the arms $a\ a$ at a short distance from the point of connection of the latter with the stud or sleeve bolts $c\ c$ are stud or sleeve bolts $g$. To the upper end of one of the bolts $g$ is pivotally connected a link $i$, a locknut $h$ being preferably employed to secure the end of the link to said stud. The link $i$ is provided with a slot $k$, through which passes the shank of another lock-nut $h$, which is connected with the top of the second stud $g$. The stud or sleeve bolts $g\ g$ are employed in order that the link $i$ may be offset from the plane of the arms $a$ to substantially the same extent as the links $b\ b$ are offset from said plane. This offsetting of the links $b\ b$ and $i$ and the handle $f$ is for the purpose of enabling the device to be applied to the tapered end of a shaft, such as shown at $x$ in Fig. 4, the graduated edges of the arms $a$ being placed in contact with diametrically opposite sides of the tapered end of the shaft, there being no obstruction, however, to prevent the application of the device, as shown in Fig. 4, even if the end of the shaft were continued to any extent, even to a point marking the center of which the sides of the tapered portion of the shaft would be radii. As indicated in Fig. 4, however, the offsetting of the parts mentioned enables the taper to be calipered while the shaft is in the lathe.

Referring to Figs. 3 and 5, which represent the inside calipers, and which specifically forms the subject matter of this application, the gage-arms $a'$ are connected by the links $b'\ b'$ at one end and the links $b^2\ b^2$ at the other end, said arms and links being connected by loose rivet-joints $d'$. The meeting or overlapping ends of the links $b'$ and $b^2$ are connected by a link or handle bar $i'$, having a slot $k'$ and formed with a handle $f'$. At the point of connection of the link $i'$ with the links $b^2$ I provide a lock or set nut $h'$, another similar lock or set nut extending through the slot $k'$ of the link $i'$ and connecting the overlapping or meeting ends of the links $b'$. As shown in Fig. 5, the inside calipers may be employed to measure the taper of the bore in the hub $y$ of a wheel, such as the propeller-wheel of a steamboat, or any other article in which a taper bore is formed.

It will be readily understood that in each of the two devices illustrated the loosening and retightening of the lock or set nuts will enable the gage-arms to be set at any angle to each other or any distance from each other within the limits of the size of the particular caliper employed. Of course in practice the calipers are made of different sizes to adapt them for all grades of work. The arms are graduated in inches or otherwise, so that the length of the fit can be measured at the same time that the taper fit is calipered. The outside calipers have each of the graduated arms supported at two points $c$ and $g$ and are braced in the positions at which they are set or secured by the link connections $i$ and $b$ $b$. The inside calipers also have their graduated arms supported at two points by the links $b'$ and $b^2$, which links, through the medium of the link $i'$ and the set-nuts $h'$, brace the arms $a'$ in their adjusted positions. In each case there is no possibility of any swinging movement of either arm after it is adjusted.

In the use of the calipers we may proceed as follows: If a machinist desires to fit a gear that is four inches through the hub to a three-inch shaft and he desires a taper hole in the gear that is three inches at the larger end of the hub and two inches at the small end, (it being supposed that Fig. 5 illustrates at $y$ the hub of such a gear,) he will secure the exact taper of the hole in the gear by means of the inside calipers, the arms of which are graduated in inches, and will measure the length through the hub, which is four inches. At the same time the taper fit will be calipered. Then the machinist takes the outside calipers and places the arms thereof on the outside of the arms of the inside calipers, with the graduations so placed as to register the four-inch mark, and then he will set the lock-nuts firmly. This places the outside calipers in condition for use by placing it on the tapered end of the shaft which he has turned or is turning for the purpose of fitting the bore in the hub $y$. He can do this while the shaft is in the lathe and can readily determine the exact taper for the end of the shaft $x$, so as to know when the shaft will fit the taper hole. It will be readily understood that the reverse of this operation will enable the measurements to be taken first of the taper of the end of a propeller-shaft by means of the outside calipers, and then setting the inside calipers by means of the outside calipers he can determine the proper bore for the hole which he may be forming in the hub of a propeller which is to fit such shaft.

As shown in Figs. 3 and 5, each pair of links $b'$ and $b^2$ have their inner ends overlapping and pivotally connected to the handle-bar $i'$ and so connected to the latter by means of the set-nuts that the said links are clamped to the handle-bar and held in their angular positions relatively thereto by the said set-nuts in such manner that the straight graduated outer edges of the arms $a'$ $a'$ will be firmly held in the positions desired to enable the measurements described to be practically taken and transferred in the manner pointed out. When a change is to be made, only the set-nuts need to be loosened and tightened to effect a firm holding of the graduated arms, which latter are supported at both ends, and therefore not liable to have their setting or adjustment disarranged.

We will add that if the arms $a$ of the outside calipers were graduated along their outside edges then the tool shown in Fig. 1 could be employed as inside calipers.

We do not herein specifically claim the outside calipers, (shown in Figs. 1, 2, and 4,) as the same forms the subject-matter of our application filed March 14, 1904, Serial No. 198,159. The illustration and description thereof, however, serve to more clearly disclose the advantages and utility of the inside calipers.

We claim—

1. Taper-calipers comprising a central handle-bar, two pair of links overlapping and pivotally connected to said bar at different distances longitudinally thereof, two arms having straight graduated outer edges, each of said arms being pivotally connected with the outer end of a link of each pair, and set-nuts for clamping the links to the handle-bar and holding them in their angular positions relatively to said bar, means being provided for adjusting one pair of links longitudinally of the handle-bar.

2. Taper-calipers comprising a central handle-bar, two pair of links overlapping and pivotally connected to said bar at different distances longitudinally thereof, two arms having straight graduated outer edges, each of said arms being pivotally connected with the outer end of a link of each pair, and set-nuts for clamping the links to the handle-bar and holding them in their angular positions relatively to said bar, the handle-bar having a longitudinal slot and the pivotal connection of one pair of links extending through said slot.

In testimony whereof we have affixed our signatures in presence of two witnesses.

OSBORNE B. CREAMER.
ALONZO J. Q. KNOWLTON.

Witnesses:
M. T. CRAWFORD,
WILLIAM EATON.